United States Patent
Sakai

(10) Patent No.: US 11,431,947 B2
(45) Date of Patent: Aug. 30, 2022

(54) OPERATION METHOD FOR INFORMATION PROCESSING DEVICE, PROGRAM, AND INFORMATION PROCESSING DEVICE

(71) Applicant: SEIKO EPSON CORPORATION, Tokyo (JP)

(72) Inventor: Toshiyuki Sakai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 49 days.

(21) Appl. No.: 17/105,216

(22) Filed: Nov. 25, 2020

(65) Prior Publication Data

US 2021/0160469 A1 May 27, 2021

(30) Foreign Application Priority Data

Nov. 26, 2019 (JP) .............................. JP2019-212927

(51) Int. Cl.
  *H04N 9/31* (2006.01)
  *H04N 5/272* (2006.01)
  *H04N 5/262* (2006.01)

(52) U.S. Cl.
  CPC ......... *H04N 9/3185* (2013.01); *H04N 5/2621* (2013.01); *H04N 5/272* (2013.01)

(58) Field of Classification Search
  CPC .............................. H04N 9/3185; H04N 5/272
  USPC ......................................................... 353/69
  See application file for complete search history.

(56) References Cited

U.S. PATENT DOCUMENTS

| 2010/0195064 A1* | 8/2010 | Kim ..................... G03B 21/14 353/121 |
| 2014/0146024 A1 | 5/2014 | Kamada et al. |

FOREIGN PATENT DOCUMENTS

| JP | 2014-106837 A | 6/2014 |
| JP | 2018-200393 A | 12/2018 |

OTHER PUBLICATIONS https://www.youtube.com/watch?v=XyWQ7wrObaQ (Year: 2015).*

* cited by examiner

*Primary Examiner* — Jerry L Brooks
(74) *Attorney, Agent, or Firm* — Oliff PLC

(57) ABSTRACT

An operation method for an information processing device having a display area used to generate a video image projected into a projection target area by a projector is provided. The method includes: in a first mode for generating the video image, specifying a designated part designated by a user in the display area; displaying, in the display area, a first video image showing a first object arranged in the designated part and a second object which moves in the display area and changes on reaching the designated part; and causing the projector to project the first video image into the projection target area; and in a second mode for the projector to project the video image into the projection target area, causing the projector to project a second video image resulting from eliminating the first object from the first video image, as the video image into the projection target area.

6 Claims, 10 Drawing Sheets

OPERATION METHOD FOR INFORMATION PROCESSING DEVICE, PROGRAM, AND INFORMATION PROCESSING DEVICE

The present application is based on, and claims priority from JP Application Serial Number 2019-212927, filed Nov. 26, 2019, the disclosure of which is hereby incorporated by reference herein in its entirety.

BACKGROUND

1. Technical Field

The present disclosure relates to an operation method for an information processing device, a program, and an information processing device.

2. RELATED ART

Projection mapping, AR (augmented reality) technology, and MR (mixed reality) technology and the like often use an image corresponding to a display area in the real world. For example, a display control device described in JP-A-2014-106837 displays an image showing a pseudo object in an area that can be used as a wall in the real world.

JP-A-2014-106837 discloses no specific technique for generating an image corresponding to the display area in the real world. Therefore, a technique that can easily generate such an image is desired.

SUMMARY

An operation method for an information processing device according to an aspect of the present disclosure is an operation method for an information processing device having a display area used to generate a video image projected into a projection target area by a projector is provided. The method includes: in a first mode for generating the video image, specifying a designated part designated by a user in the display area; displaying, in the display area, a first video image showing a first object arranged in the designated part and a second object which moves in the display area and changes on reaching the designated part; and causing the projector to project the first video image into the projection target area; and in a second mode for the projector to project the video image into the projection target area, causing the projector to project a second video image resulting from eliminating the first object from the first video image, as the video image into the projection target area.

A non-transitory computer-readable storage medium according to another aspect of the present disclosure stores a program. The program causes an information processing device having a display area used to generate a video image projected into a projection target area by a projector, to execute: in a first mode for generating the video image, processing of specifying a designated part designated by a user in the display area; processing of displaying, in the display area, a first video image showing a first object arranged in the designated part and a second object which moves in the display area and changes on reaching the designated part; and processing of causing the projector to project the first video image into the projection target area; and in a second mode for the projector to project the video image into the projection target area, processing of causing the projector to project a second video image resulting from eliminating the first object from the first video image, as the video image into the projection target area.

An information processing device according to still another aspect of the present disclosure includes: a specifying unit specifying a designated part designated by a user in a display area used to generate a video image projected into a projection target area by a projector, in a first mode for generating the video image; a display control unit displaying, in the display area, a first video image showing a first object arranged in the designated part and a second object which moves in the display area and changes on reaching the designated part, in the first mode; and a projection control unit causing the projector to project the first video image into the projection target area, in the first mode, and causing the projector to project a second video image resulting from eliminating the first object from the first video image, as the video image into the projection target area, in a second mode for the projector to project the video image into the projection target area.

DESCRIPTION OF EXEMPLARY EMBODIMENTS

A. First Embodiment

A1. Outline of Projection System 1000

Figure 1:
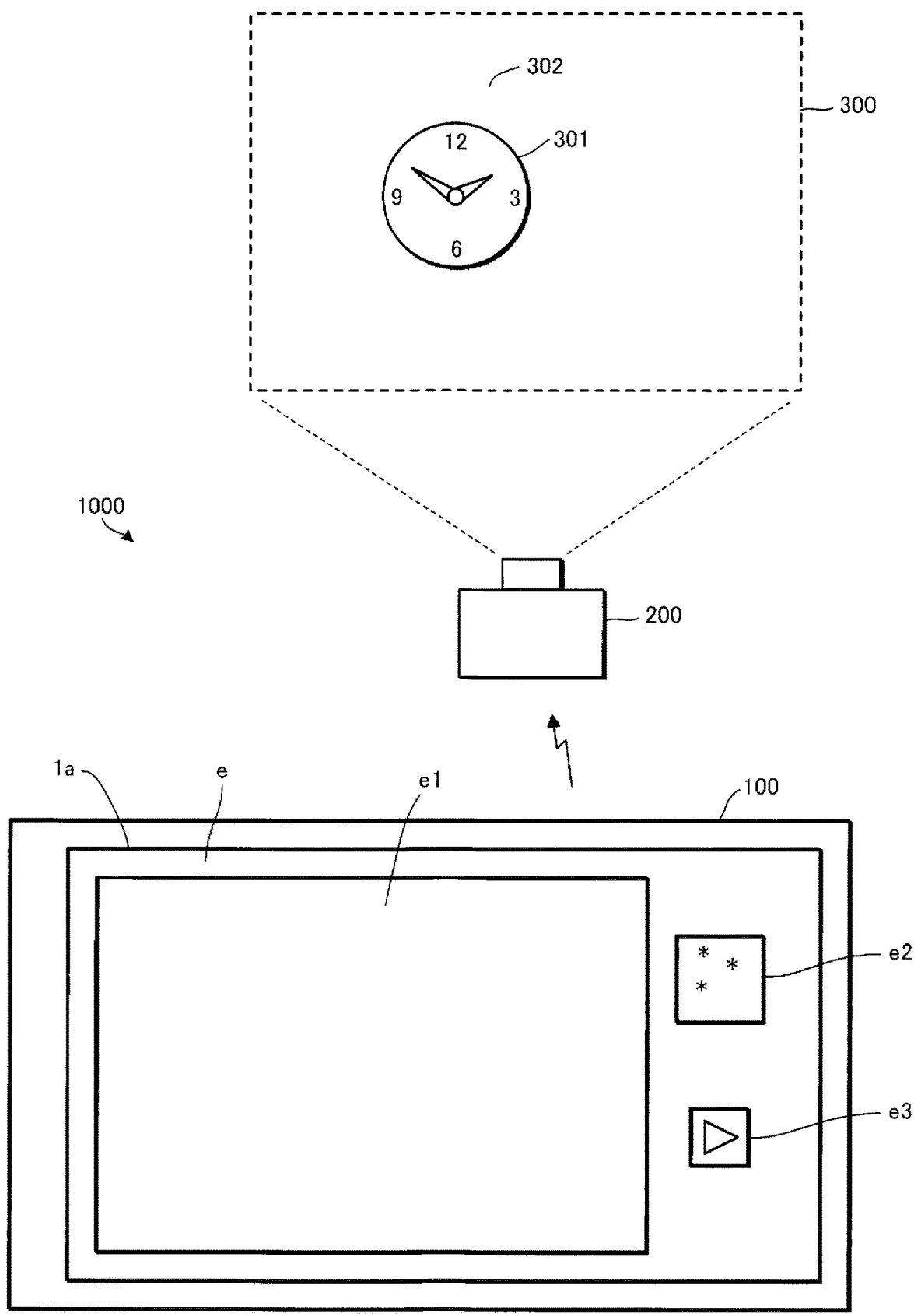
FIG. 1 shows a projection system 1000 according to a first embodiment.

FIG. 1 shows a projection system 1000 according to a first embodiment. The projection system 1000 includes an information processing device 100 and a projector 200. The projector 200 projects an image such as a video image into a projection target area 300 including a timepiece 301 and a wall 302 and thus implements, for example, projection mapping. The projection target area 300 is not limited to an area including the timepiece 301 and the wall 302.

The information processing device 100 is, for example, a smartphone. The information processing device 100 is not limited to a smartphone. The information processing device 100 may be, for example, a PC (personal computer) or tablet terminal.

The information processing device 100 includes a display surface 1a displaying various images. The display surface 1a displays, for example, an operation screen e illustrated in FIG. 1. The operation screen e is used to generate a video image. The operation screen e includes a display area e1, a video image instruction section e2, and a playback button e3.

The display area e1 is an area for generating a video image. The display area e1 is also an area where the generated video image is displayed. The background image of the display area e1 is a black image. However, the background image of the display area e1 is not limited to a black image. For example, the background image of the display area e1 may be a blue image or white image.

Figure 2:
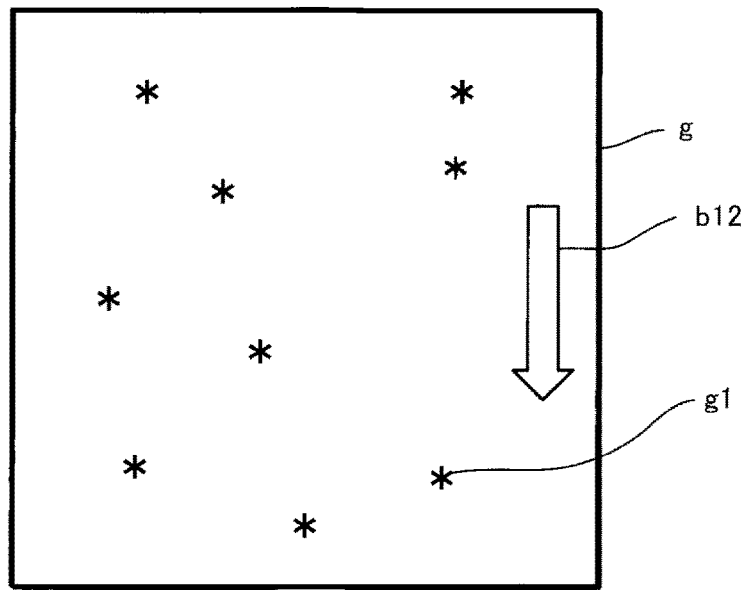
FIG. 2 shows an example of a video image part g.
Figure 3:
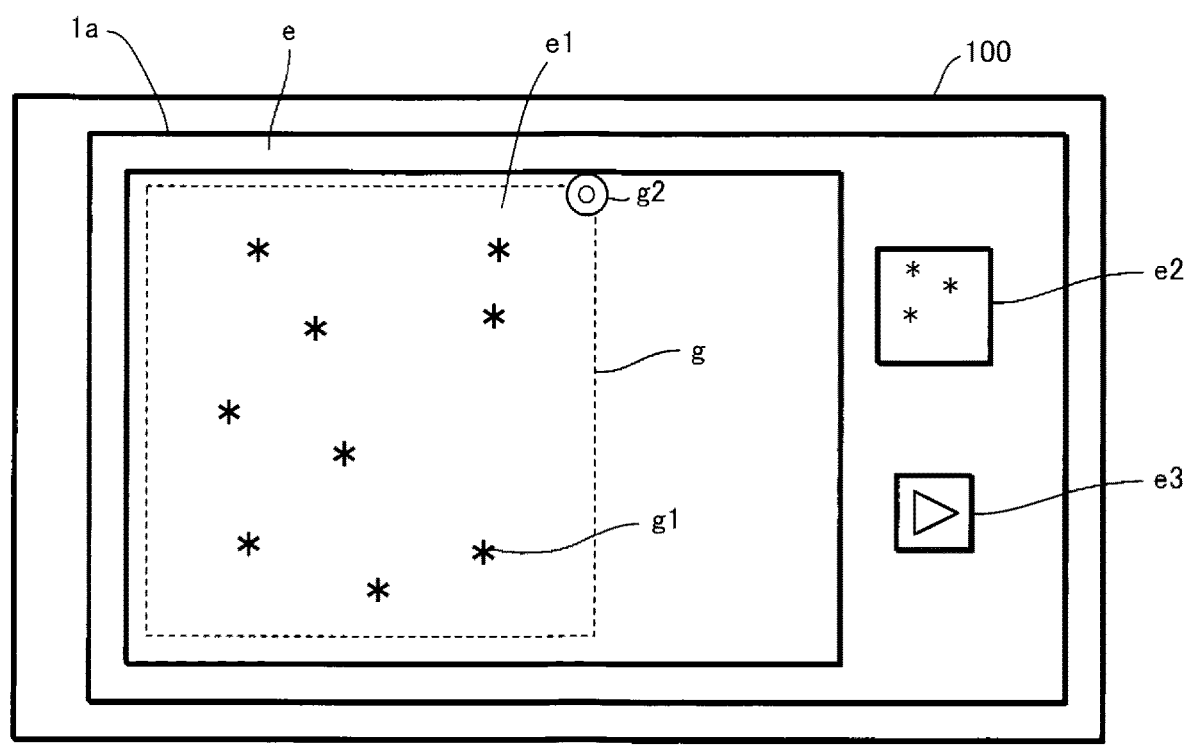
FIG. 3 shows an example of a display area e1 where the video image part g is displayed.

The video image instruction section e2 corresponds to a video image part g as illustrated in FIG. 2. The video image part g is a video image showing a snowflake g1 moving in the direction of a first arrow b12. When the video image instruction section e2 is operated, the video image part g is displayed in the display area e1, as illustrated in FIG. 3. The playback button e3 is a button for playing the video image generated in the display area e1.

A video image generated by the information processing device 100 is, for example, repeatedly projected into the projection target area 300 by the projector 200. The first image in a video image coincides with the last image, a person viewing this video image is highly likely to recognize the video image that is repeatedly played, as a seamless video image. Such a video image is used, for example, for a product advertisement or for a light effect to create a certain impression of a product.

A2. Example of Information Processing Device 100

Figure 4:
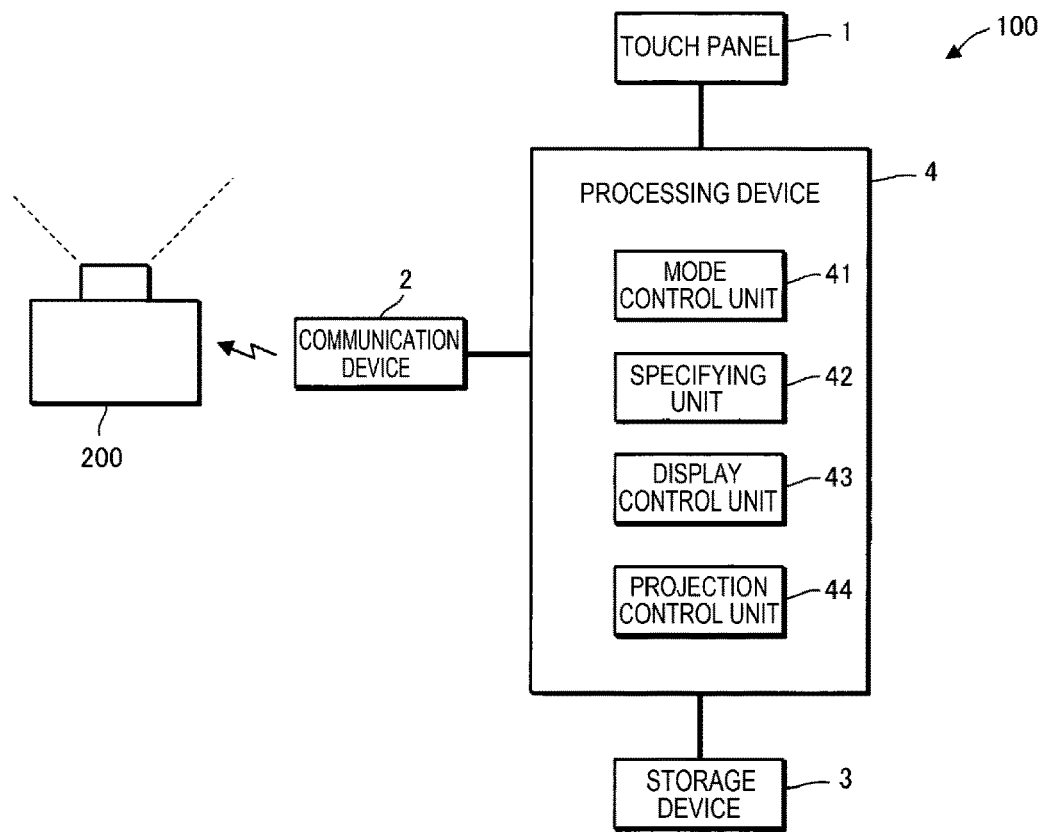
FIG. 4 shows an example of an information processing device 100.

FIG. 4 shows an example of the information processing device 100. The information processing device 100 includes a touch panel 1, a communication device 2, a storage device 3, and a processing device 4.

The touch panel 1 is a device in which a display device displaying an image and an input device accepting an operation by a user are integrated together. Instead of the touch panel 1, a display device and an input device that are independent of each other may be used. The touch panel 1 includes the display surface 1a. The touch panel 1 displays various images on the display surface 1a. The touch panel 1 detects a touch position, using an electrostatic capacitance specified by an object in contact with the touch panel 1 and the touch panel 1.

The communication device 2 communicates with various devices. The communication device 2 communicates, for example, with the projector 200 via a wireless LAN (local area network). The communication device 2 may communicate with a device such as the projector 200 via a different communication form from wireless LAN. For example, wired communication or Bluetooth may be used. Bluetooth is a registered trademark.

The storage device 3 is a recording medium readable to the processing device 4. The storage device 3 includes, for example, a non-volatile memory and a volatile memory. The non-volatile memory is, for example, a ROM (read-only memory), EPROM (erasable programmable read-only memory), or EEPROM (electrically erasable programmable read-only memory). The volatile memory is, for example, a RAM.

The storage device 3 stores a program executed by the processing device 4 and various data used by the processing device 4. The program can also be referred to as an □application program□, □application software□, or □app□. The program is acquired, for example, from a server or the like, not illustrated, via the communication device 2 and is subsequently stored in the storage device 3. The program may be stored in the storage device 3 in advance.

The processing device 4 is formed, for example, of a single processor or a plurality of processors. In an example, the processing device 4 is formed of a single CPU (central processing unit) or a plurality of CPUs. Apart or all of the functions of the processing device 4 may be implemented by a circuit such as a DSP (digital signal processor), ASIC (application-specific integrated circuit), PLD (programmable logic device), or FPGA (field-programmable gate array). The processing device 4 executes various kinds of processing in parallel or successively. The processing device 4 reads the program from the storage device 3. The processing device 4 executes this program and thus implements a mode control unit 41, a specifying unit 42, a display control unit 43, and a projection control unit 44.

The mode control unit 41 controls the operation mode of the information processing device 100. The mode control unit 41 includes a first mode and a second mode to be set as the operation mode. The first mode is a mode for generating a video image. The second mode is a mode for the projector 200 to project a video image into the projection target area 300. The mode control unit 41 sets the operation mode, for example, in response to a touch operation on the touch panel 1.

Figure 5:
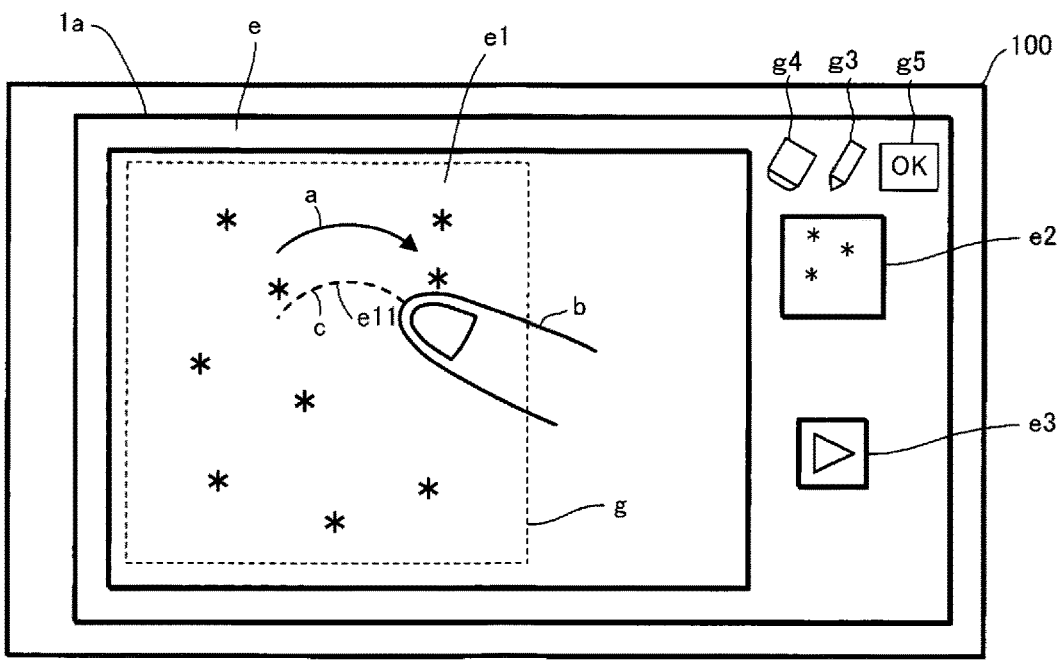
FIG. 5 shows an example of a designated part e11.

The specifying unit 42, in the first mode, specifies a designated part e11 designated by the user in the display area e1, as illustrated in FIG. 5. In the example shown in FIG. 5, the specifying unit 42 specifies a trajectory c of a finger b of the user moving on the display area e1 while touching the display area e1, as the designated part e11.

Figure 6:
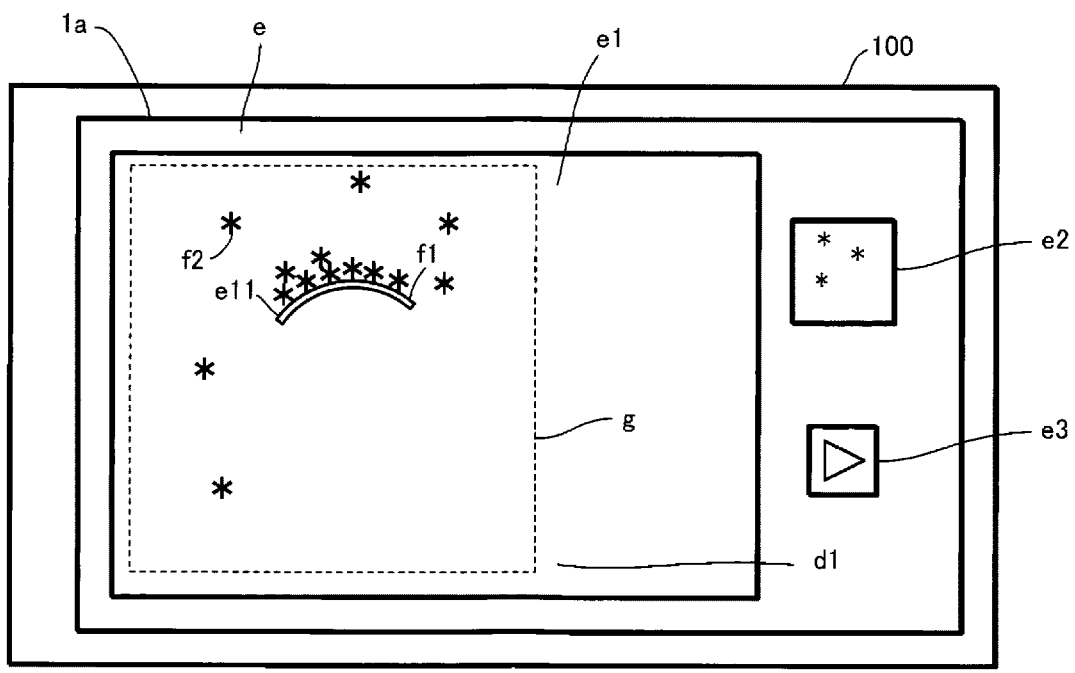
FIG. 6 shows an example of the display area e1 where a first video image d1 is displayed.

The display control unit 43 controls the display on the display surface 1a. The display control unit 43, in the first mode, displays, for example, a first video image d1 as shown in FIG. 6 in the display area e1 when the designated part e11 is specified. The first video image d1 shows a first object f1 arranged in the designated part e11, and a second object f2 moving in the display area e1 and changing on reaching the designated part e11.

The first object f1 is a solid line indicating the trajectory c shown in FIG. 5. The first object f1 is not limited to a solid line. The first object f1 may be, for example, a dashed line indicating the trajectory c, a wave line indicating the trajectory c, or a dotted line indicating the trajectory c.

The second object f2 is a snowflake moving in the display area e1 and ending the movement on reaching the designated part e11. The second object f2, which is a snowflake, also ends the movement on reaching another second object f2 that has ended its movement. Therefore, the first video image d1 shows snow piling up on the first object f1 located at the designated part e11.

The change in the second object f2 is not limited to stopping the movement. The change in the second object f2 may be changing the direction of movement. For example, the direction of movement of the second object f2 may change into a direction along the designated part e11 when the second object f2 has reached the designated part e11.

The change in the second object f2 is not limited to a change in the movement of the second object f2. The change in the second object f2 may be a change in the shape of the second object f2, a change in the size of the second object f2, a change in the color of the second object f2, or the disappearance of the second object f2. The change in the second object f2 may also be a combination of two or more changes arbitrarily selected from the foregoing changes without contradicting each other.

The second object f2 is not limited to a snowflake. The second object f2 may be, for example, a raindrop, soap bubble, or animal.

Figure 7:
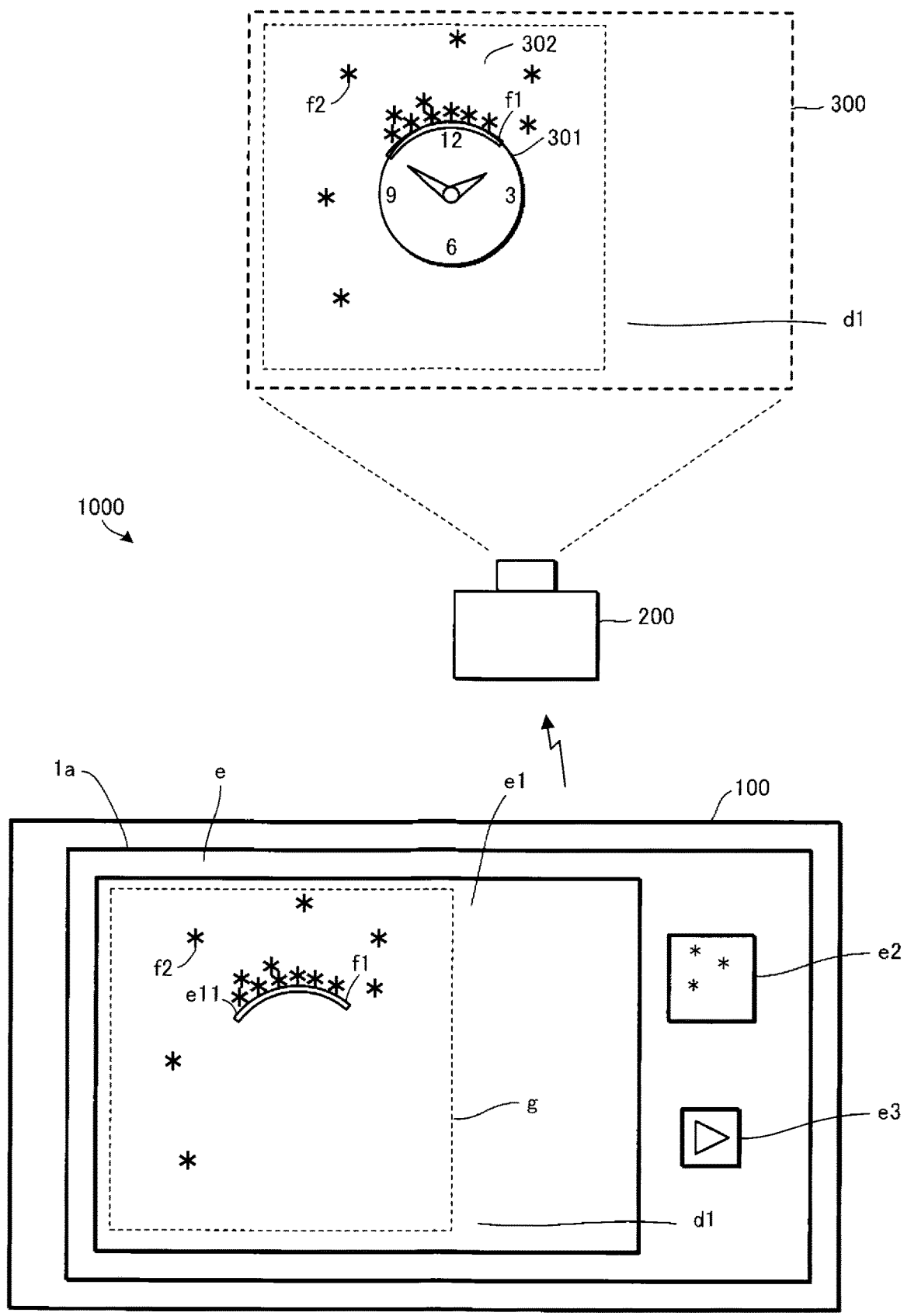
FIG. 7 shows an example of projection of an image in a first mode.

The projection control unit 44, in the first mode, causes the projector 200 to project the first video image d1 into the projection target area 300, as illustrated in FIG. 7. In this case, when the designated part e11 in the first video image d1 is located at an upper part of the timepiece 301 in the projection target area 300, snow piling up on the upper part of the timepiece 301 is shown. Moreover, in the first mode, the first object f1 located at the designated part e11 is displayed as well. Therefore, the user can easily determine that the designated part e11 is located at the upper part of the timepiece 301 in the projection target area 300 before snow piles up.

Figure 8:
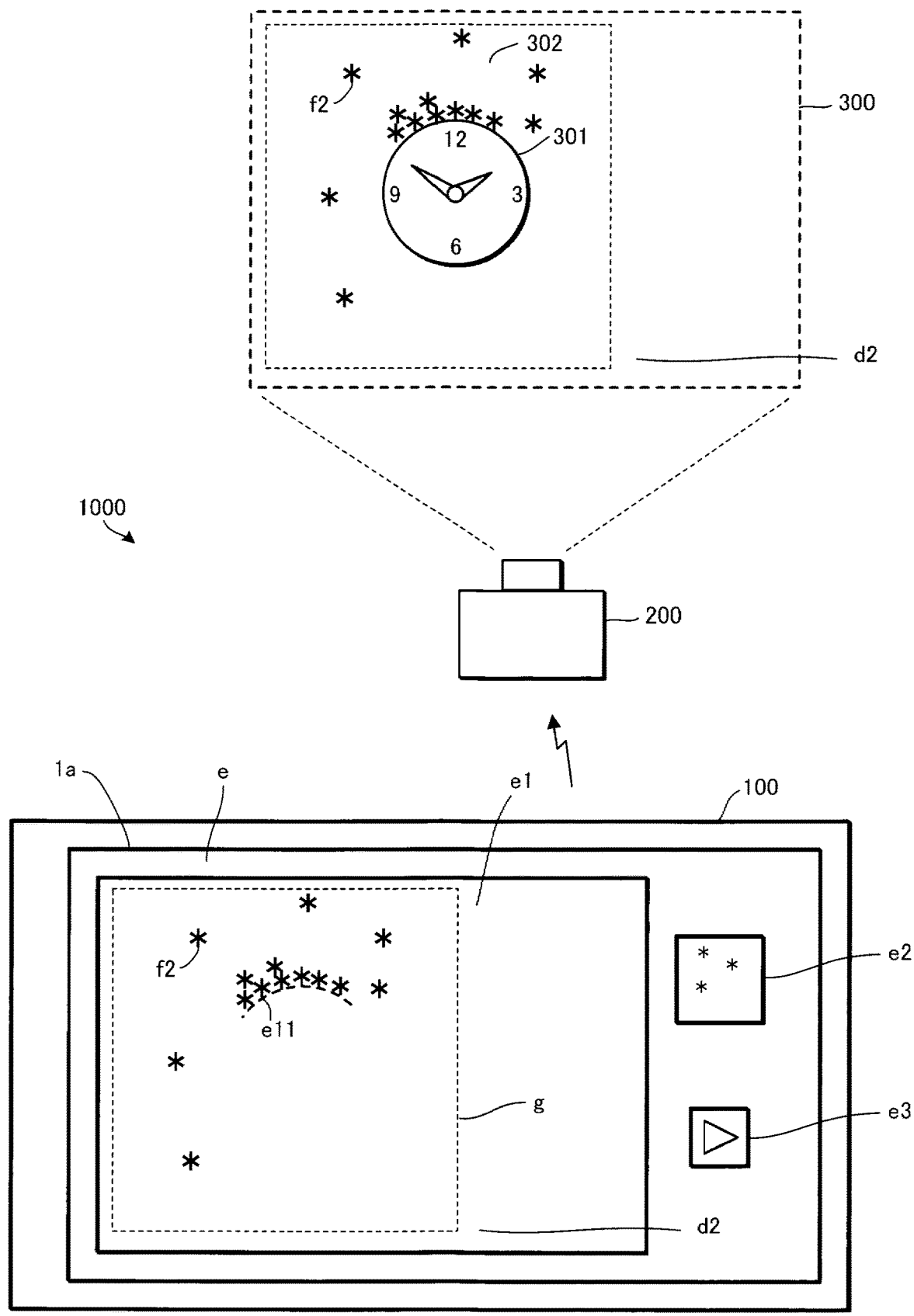
FIG. 8 shows an example of projection of an image in a second mode.

The projection control unit 44, in the second mode, causes the projector 200 to project a second video image d2 resulting from eliminating the first object f1 from the first video image d1, as the video image into the projection target area 300, as illustrated in FIG. 8. Therefore, in the second mode, the first object f1, which is not necessary, is not displayed and therefore a high-quality video image can be projected in the projection target area 300.

A3. Explanation of Operations

Figure 9:
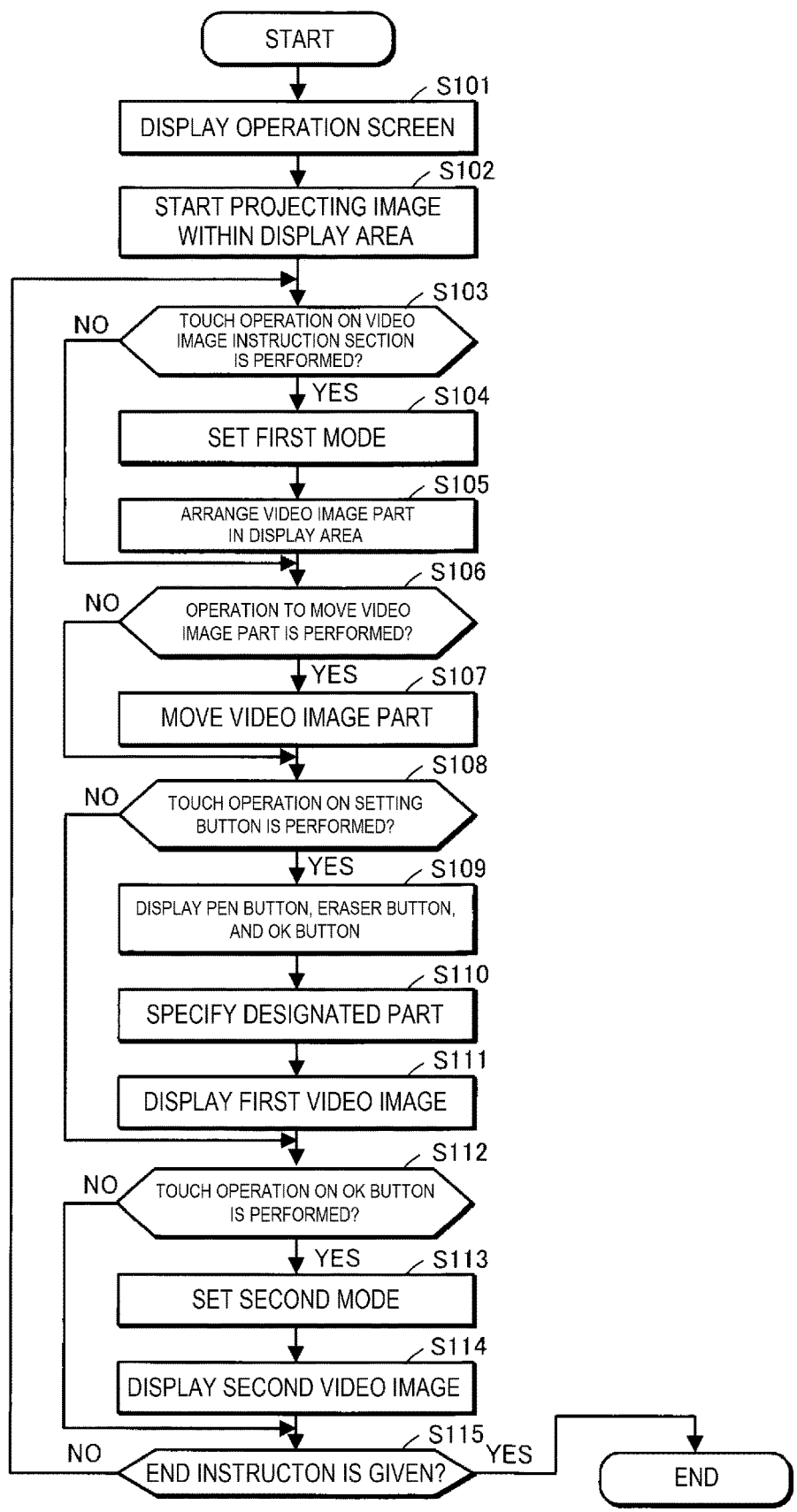
FIG. 9 is a flowchart for explaining operations.

FIG. 9 is a flowchart for explaining operations of the information processing device 100. In the description below, it is assumed that a specific icon corresponding to the program stored in the storage device 3 is displayed on the display surface 1a.

When the user touches the specific icon displayed on the display surface 1a with a finger, the touch panel 1 outputs touch position information representing the touch position of the finger to the processing device 4. When the touch position represented by the touch position information is the position of the specific icon, the processing device 4 reads a program corresponding to the specific icon from the storage device 3. The processing device 4 then executes the program read from the storage device 3 and thus implements the mode control unit 41, the specifying unit 42, the display control unit 43, and the projection control unit 44.

Next, in step S101, the display control unit 43 provides initial operation image data representing the operation screen e shown in FIG. 1 to the touch panel 1 and thus causes the touch panel 1 to display the operation screen e on the display surface 1a.

Next, in step S102, the projection control unit 44 starts transmitting image data representing an image displayed in the display area e1, for example, image data representing a video image, from the communication device 2 to the projector 200. On receiving the image data from the information processing device 100, the projector 200 projects the image represented by this image data, for example, a video image, into the projection target area 300. Therefore, the user can prepare a video image or the like in the display area e1 while viewing the image projected in the projection target area 300.

Next, when the user touches the video image instruction section e2 with a finger, the touch panel 1 outputs touch position information representing the touch position of the finger to the processing device 4. When the touch position represented by the touch position information is the position of the video image instruction section e2, the mode control unit 41 in step S103 determines that a touch operation on the video image instruction section e2 is performed.

On determining that a touch operation on the video image instruction section e2 is performed, the mode control unit 41 in step S104 sets the operation mode to the first mode.

When the operation mode has become the first mode, the display control unit 43 in step S105 arranges the video image part g in the display area e1, as illustrated in FIG. 3.

Specifically, the display control unit 43 first generates first operation image data representing a video image in which the video image part g is located in the display area e1. Next, the display control unit 43 outputs the first operation image data to the touch panel 1 and thus causes the touch panel 1 to display the video image in which the video image part g is located in the display area e1 on the display surface 1a. The projector 200 projects the video image in which the video image part g is located in the display area e1, into the projection target area 300, based on the image data received from the display control unit 43 via the communication device 2.

The position of the video image part g in the display area e1 is not limited to the position shown in FIG. 3. For example, the position of the video image part g in the display area e1 may be set in such a way that the centroid position of the video image part g fits the centroid position of the display area e1.

Next, when the user moves a finger while touching the video image part g with the finger, the touch panel 1 outputs touch position information representing a trajectory of the touch position of the finger to the processing device 4. When the start position of the trajectory represented by the touch position information is the position where the video image part g is present, the display control unit 43 in step S106 determines that an operation to move the video image part g is performed.

On determining that an operation to move the video image part g is performed, the display control unit 43 in step S107 moves the position of the video image part g along the trajectory represented by the touch position information.

The display control unit 43 may change the size of the video image part g in response to an operation on the video image part g.

Next, when the user touches a setting button g2 provided at the video image part g with a finger, the touch panel 1 outputs touch position information representing the touch position of the finger to the processing device 4. The form of the setting button g2 is not limited to the form shown in FIG. 3. For example, the form of the setting button g2 may be a gear mark showing a gear. When the touch position represented by the touch position information is the position of the setting button g2, the display control unit 43 in step S108 determines that a touch operation on the setting button g2 is performed.

On determining that a touch operation on the setting button g2 is performed, the display control unit 43 in step S109 outputs image data representing an image in which a pen button g3, an eraser button g4, and an OK button g5 are added to the operation screen e, to the touch panel 1, and thus causes the touch panel 1 to display the pen button g3, the eraser button g4, and the OK button g5 in the operation screen e, as illustrated in FIG. 5.

The pen button g3 is used to designate the designated part e11 and more specifically to display the first object f1. The eraser button g4 is used to erase at least a part of the designated part e11 and more specifically to erase at least a part of the first object f1. The OK button g5 is used to finalize the designated part e11 and more specifically the first object f1. The form of the pen button g3, the form of the eraser button g4, and the form of the OK button g5 are not limited to the forms shown in FIG. 5 and can be changed according to need.

Next, when the user touches the pen button g3 with the finger b and subsequently moves the finger b touching the display area e1 in the direction of a second arrow a on the display area e1, with the finger b still touching the display area e1, for example, as shown in FIG. 5, the specifying unit 42 in step S110 specifies the trajectory c of the finger b as the designated part e11 in response to the output from the touch panel 1 corresponding to the operation with the finger b. The shape of the trajectory c is not limited to the shape shown in FIG. 5.

Next, the display control unit 43 in step S111 causes the first video image d1 to be displayed in the display area e1, as illustrated in FIG. 7. The first video image d1 shows the first object f1 arranged in the designated part e11 and the second object f2 moving in the display area e1 and changing on reaching the designated part e11, as described above. At this time, the projection control unit 44 transmits image data representing the first video image d1 from the communication device 2 to the projector 200 and thus causes the projector 200 to project the first video image d1 into the projection target area 300. Meanwhile, when the eraser button g4 is touched and the designated part e11 is subsequently touched, the display control unit 43 erases the touched part of the designated part e11. Therefore, the user can edit the designated part e11.

Next, when the user touches the OK button g5 with the finger b, the touch panel 1 outputs touch position information representing the touch position of the finger to the processing device 4. When the touch position represented by the touch position information is the position of the OK button g5, the mode control unit 41 in step S112 determines that a touch operation on the OK button g5 is performed.

On determining that a touch operation on the OK button g5 is performed, the mode control unit 41 in step S113 switches the operation mode from the first mode to the second mode.

When the operation mode has been switched to the second mode, the display control unit 43 causes the second video image d2 to be displayed in the display area e1, in step S114 as illustrated in FIG. 8. The second video image d2 is a video image resulting from eliminating the first object f1 from the first video image d1, as described above. At this time, the projection control unit 44 transmits image data representing the second video image d2 from the communication device 2 to the projector 200 and thus causes the projector 200 to project the second video image d2 into the projection target area 300.

Subsequently, when an end instruction is given in step S115, for example, when an operation on an end instruction button, not illustrated, is performed, the operation ends.

When the touch position represented by the touch position information is not the position of the video image instruction section e2 in step S103, the processing goes to step S106 instead of step S104.

When the start position of the trajectory represented by the touch position information is not the position where the video image part g is present in step S106, the processing goes to step S108 instead of step S107.

When the touch position represented by the touch position information is not the position of the setting button g2 in step S108, the processing goes to step S112 instead of step S109.

When the touch position represented by the touch position information is not the position of the OK button g5 in step S112, the processing goes to step S115 instead of step S113.

When an end operation is not performed in step S115, the processing returns to step S103.

A4. Overview of First Embodiment

The image data generation method, the program, and the information processing device 100 according to the embodiment includes the following configurations.

The specifying unit 42 specifies the designated part e11 designated by the user in the display area e1 used to generate a video image, in the first mode for generating a video image projected by the projector 200 into the projection target area 300. The display control unit 43, in the first mode, displays, in the display area e1, the first video image d1 showing the first object f1 arranged in the designated part e11 and the second object f2 which moves in the display area e1 and changes on reaching the designated part e11. The projection control unit 44, in the first mode, causes the projector 200 to project the first video image d1 into the projection target area 300. In the second mode for the projector 200 to project a video image into the projection target area 300, the projection control unit 44 projects the second video image d2 resulting from eliminating the first object f1 from the first video image d1, as the video image, into the projection target area 300.

This configuration enables the user to easily generate an image corresponding to a display area in the real world, for example, by setting the designated part e11 according to the shape of an object present in the display area in the real world.

Also, in the first mode, the first object f1 indicating the position of the designated part e11 is displayed in the projection target area 300. Therefore, the user can easily determine whether the designated part e11, where the state of the second object f2 is changed, is located in an expected position in the projection target area 300 or not.

Moreover, in the second mode, since the first object f1 indicating the position of the designated part e11 is not displayed in the projection target area 300, a high-quality video image can be projected in the projection target area 300.

B. Modification Examples

Modified configurations of the foregoing embodiment will now be described. Two or more configurations arbitrarily selected from the examples described below may be suitably combined together without contracting each other.

B1. First Modification Example

In the first embodiment, a black image is used as the background image of the display area e1. In a first modification example, a background image of the display area e1 is generated, based on a first picked-up image generated by picking up, with a camera 250, an image of an image pickup area 350 including the projection target area 300 in the state where the projector 200 is not projecting any image. This configuration enables an image showing the projection target area 300 to be displayed in the display area e1. Thus, for example, the positional relationship between the designated part e11 and the timepiece 301 can be checked in the display area e1.

Figure 10:
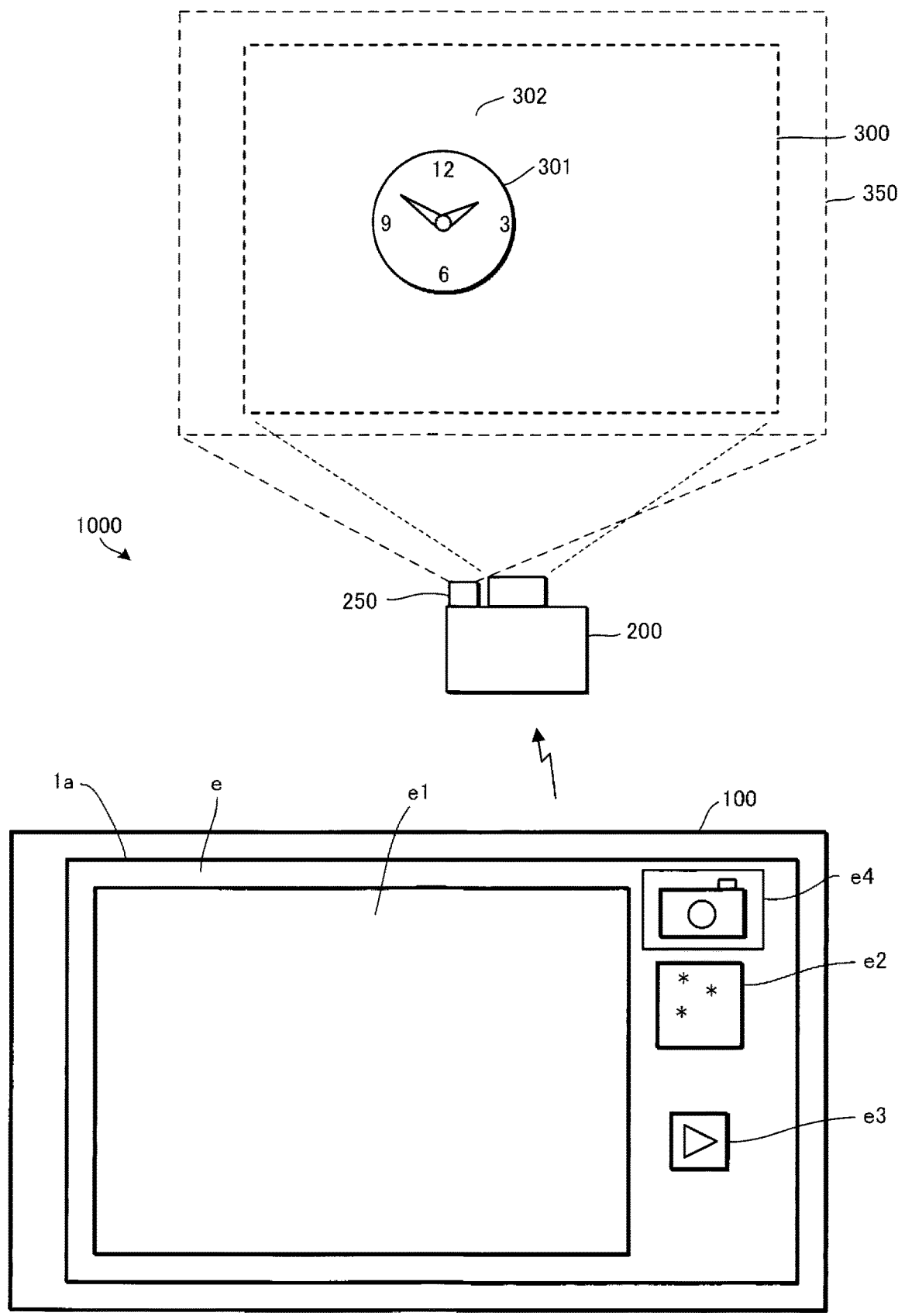
FIG. 10 shows a first modification example.

The camera 250 is installed in the projector 200, as illustrated in FIG. 10. The camera 250 may be a separate unit from the projector 200. The camera 250 is an example of an image pickup device. The camera 250 includes a light-receiving optical system such as a lens, and an image pickup element converting light condensed by the light-receiving optical system into an electrical signal. The image pickup element is, for example, a CCD (charge-coupled device) image sensor which receives light in an infrared range or visible range. The image pickup element is not limited to a CCD image sensor and may be, for example, a CMOS (complementary metal oxide semiconductor) image sensor which receives light in an infrared range or visible range.

The camera 250 picks up an image of the image pickup area 350 in the state where the projector 200 is not projecting any image, and thus generates first picked-up image data representing the first picked-up image. The camera 250 transmits the first picked-up image data to the information processing device 100.

The display control unit 43 generates a background image of the display area e1, based on the first picked-up image data, that is, based on the first picked-up image represented by the first picked-up image data.

As illustrated in FIG. 10, in this configuration, the operation screen e also includes an image pickup button e4 to cause the camera 250 to execute image pickup. The position of the image pickup button e4 in the operation screen e is not limited to the position shown in FIG. 10 and can be suitably changed. Also, the form of the image pickup button e4 is not limited to the form shown in FIG. 10 and can be suitably changed.

When the image pickup button e4 is touched, the display control unit 43 first transmits a projection prohibition instruction to prohibit the projection of an image, from the communication device 2 to the projector 200, and thus prohibits the projection of an image by the projector 200.

Figure 11:
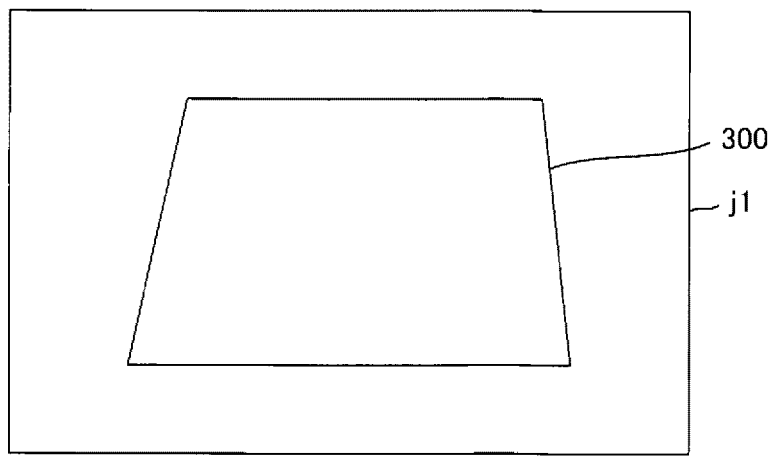
FIG. 11 shows an example of a first picked-up image j1.

Next, the display control unit 43 transmits an image pickup instruction from the communication device 2 to the camera 250 and thus causes the camera 250 to pick up an image of the image pickup area 350. The camera 250 picks up an image of the image pickup area 350 according to the image pickup instruction and thus generates first picked-up image data representing a first picked-up image j1. FIG. 11 shows an example of the outer shape of the projection target area 300 shown in the first picked-up image j1. In the example shown in FIG. 11, the outer shape of the projection target area 300 has a distortion due to the positional relationship between the camera 250 and the projection target area 300. The camera 250 transmits the first picked-up image data to the information processing device 100. In the information processing device 100, the display control unit 43 stores the first picked-up image data received by the communication device 2 into the storage device 3.

Figure 12:
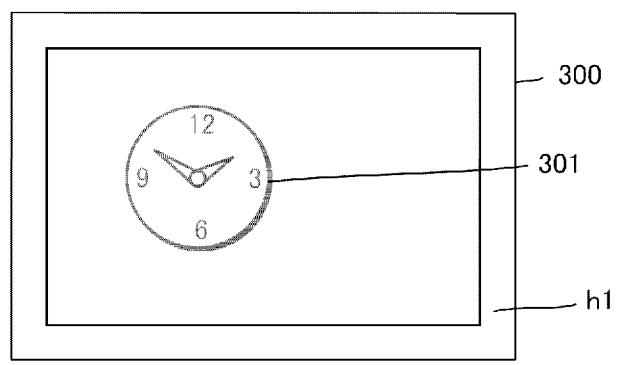
FIG. 12 shows an example of a projection target area 300 where a specified image is projected.

Next, the display control unit 43 transmits specific image data representing a specific image showing a red marker h1 as illustrated in FIG. 12 from the communication device 2 to the projector 200, and thus causes the projector 200 to project the specific image having the marker h1 into the projection target area 300. The specific image having the marker h1 is an example of a predetermined image. In the specific image, the distortion due to the positional relationship between the projector 200 and the projection target area 300 has been corrected. The marker h1 is not limited to the red frame-like shape shown in FIG. 12. The color of the marker h1 may be different from red. The shape of the marker h1 may be different from the frame-like shape.

Figure 13:
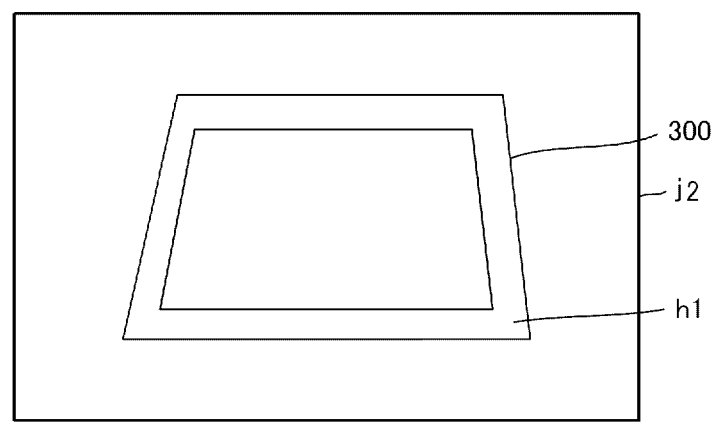
FIG. 13 shows an example of a second picked-up image j2.

Next, the display control unit 43 transmits an image pickup instruction from the communication device 2 to the camera 250 and thus causes the camera 250 to pick up an image of the image pickup area 350. The camera 250 picks up an image of the image pickup area 350 according to the image pickup instruction and thus generates second picked-up image data representing a second picked-up image j2. FIG. 13 shows an example of the outer shape of the projection target area 300 shown in the second picked-up image j2. In the example shown in FIG. 13, too, the outer shape of the projection target area 300 has a distortion due to the positional relationship between the camera 250 and the projection target area 300, as in the example shown in FIG. 11. The camera 250 transmits the second picked-up image data to the information processing device 100. In the information processing device 100, the display control unit 43 stores the second picked-up image data received by the communication device 2 into the storage device 3.

Next, the display control unit 43 specifies the positional relationship between the second picked-up image j2 and a specific image shown in the second picked-up image j2, based on the second picked-up image j2 represented by the second picked-up image data. The position of the specific image represents the position of the projection target area 300. For example, the display control unit 43 first identifies the marker h1 shown in the second picked-up image j2. Next, the display control unit 43 detects the position in the second picked-up image j2 of the specific image specified by the marker h1.

Next, the display control unit 43 specifies a projection area image showing the projection target area 300 in the first picked-up image j1 represented by the first picked-up image data, based on the positional relationship between the second picked-up image j2 and the specific image shown in the second picked-up image j2. For example, the display control unit 43 specifies an area within the first picked-up image j1 having a positional relationship with the first picked-up image j1 that is the same as the positional relationship between the second picked-up image j2 and the specific image, as the projection area image.

Next, the display control unit 43 performs keystone correction processing on the projection area image and thus generates a background image of the display area e1. For example, the display control unit 43 changes the shape of the projection area image to a rectangle having the aspect ratio of the display area e1 and thus generates a background image of the display area e1.

Figure 14:
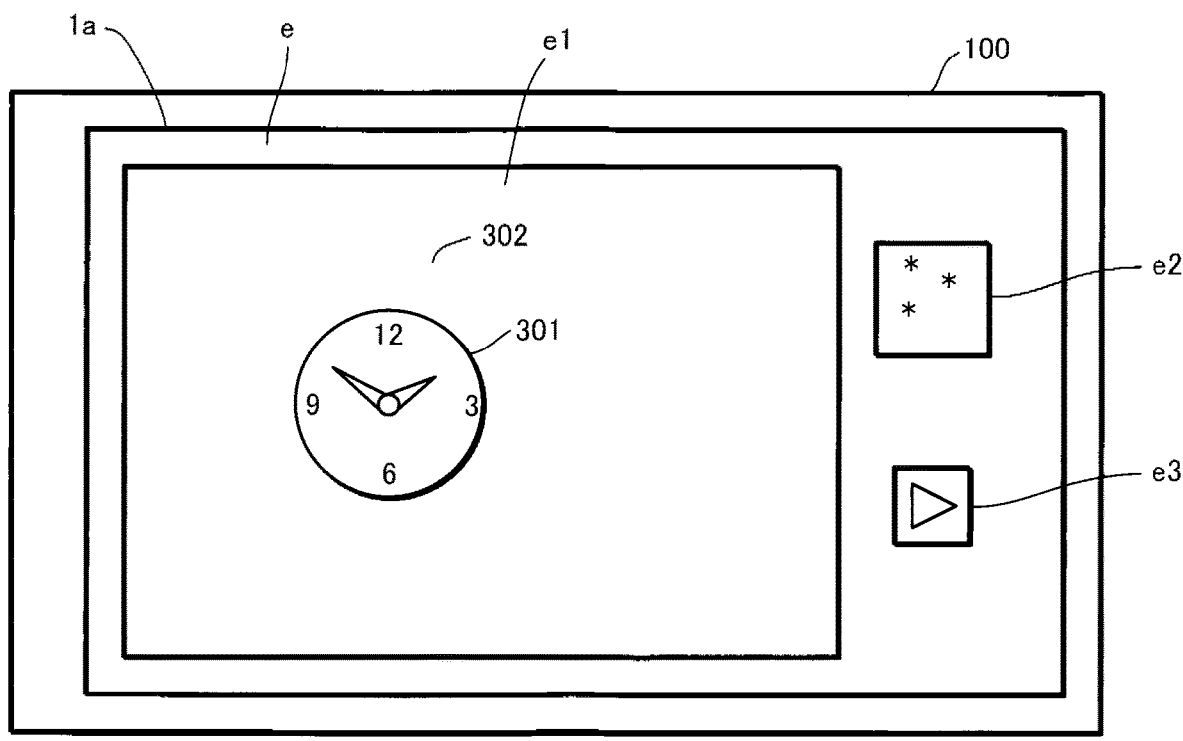
FIG. 14 shows an example of an operation screen e in the first modification example.

Next, the display control unit 43 sets the background image generated based on the projection area image, as the background image of the display area e1, as illustrated in FIG. 14.

According to this configuration, an image showing the projection target area 300 is displayed as the background at the information processing device 100 and therefore the user can generate a video image without viewing the actual projection target area 300. Also, the user can generate a video image while checking both of the state of the actual projection target area 300 and the display area e1. This makes the information processing device 100 user-friendly. In this configuration, when the projector 200 is moved, an image of the projection target area 300 needs to be picked up again.

B2. Second Modification Example

In the first embodiment and the first modification example, the positional relationship between the display area e1, the video image instruction section e2, and the playback button e3 is not limited to the positional relationship shown in FIG. 1 or FIG. 10. The video image instruction section e2 may be displayed in a different screen from the screen where the display area e1 is displayed.

B3. Third Modification Example

In the first embodiment and the first and second modification examples, the number of sets of the video image part g and the video image instruction section e2 is not limited to one and may be two or more.

B4. Fourth Modification Example

In the first embodiment and the first to third modification examples, the mode control unit 41, the specifying unit 42, the display control unit 43, and the projection control unit 44 may be provided at a server communicating with a terminal device, instead of at a terminal such as a smartphone. In this case, the server causes the terminal device to display the operation screen e on the display surface and causes the terminal device to execute the foregoing operation, based on an operation on the operation screen e. In this configuration, the server functions as an information processing device.

What is claimed is:

1. An operation method for an information processing device having a display area used to generate a video image projected into a projection target area by a projector, the method comprising:
   in a first mode for generating the video image,
      specifying a designated part designated by a user in the display area;
      displaying, in the display area, a first video image showing a first object arranged in the designated part and a second object which moves in the display area and changes when the second object reaches the designated part; and
      causing the projector to project the first video image into the projection target area; and
   in a second mode for the projector to project the video image into the projection target area,
      causing the projector to project, as the video image into the projection target area, a second video image in which the first object is eliminated from the first video image but the designated part remains so that the second object still changes when the second object reaches the designated part.

2. The operation method for the information processing device according to claim 1, further comprising:
   generating a background image of the display area, based on a first picked-up image generated by picking up, with a camera, an image of an image pickup area including the projection target area in a state where the projector is not projecting an image.

3. The operation method for the information processing device according to claim 2, further comprising:
   causing the projector to project a predetermined image into the projection target area;
   based on a second picked-up image generated by picking up, with the camera, an image of the image pickup area in a state where the projector is projecting the predetermined image into the projection target area, specifying a positional relationship between the second picked-up image and the predetermined image shown in the second picked-up image;
   specifying a projection area image showing the projection target area in the first picked-up image, based on the positional relationship; and
   preparing the background image, based on the projection area image.

4. The operation method for the information processing device according to claim 3, further comprising:
   performing keystone correction processing on the projection area image and thus generating the background image.

5. A non-transitory computer-readable storage medium storing a program, the program causing an information processing device, which has a display area used to generate a video image projected into a projection target area by a projector, to execute:
   in a first mode for generating the video image,
      processing of specifying a designated part designated by a user in the display area;
      processing of displaying, in the display area, a first video image showing a first object arranged in the designated part and a second object which moves in the display area and changes when the second object reaches the designated part; and
      processing of causing the projector to project the first video image into the projection target area; and
   in a second mode for the projector to project the video image into the projection target area,
      processing of causing the projector to project, as the video image into the projection target area, a second video image in which the first object is eliminated from the first video image but the designated part remains so that the second object still changes when the second object reaches the designated part.

6. An information processing device comprising:
   a specifying unit specifying a designated part designated by a user in a display area used to generate a video image projected into a projection target area by a projector, in a first mode for generating the video image;
   a display control unit displaying, in the display area, a first video image showing a first object arranged in the designated part and a second object which moves in the display area and changes when the second object reaches the designated part, in the first mode; and
   a projection control unit (i) causing, in the first mode, the projector to project the first video image into the projection target area and (ii) causing, in a second mode for the projector to project the video image into the projection target area, the projector to project, as the video image into the projection target area, a second video image in which the first object is eliminated from the first video image but the designated part remains so that the second object still changes when the second object reaches the designated part.

* * * * *